United States Patent
Wu et al.

(10) Patent No.: US 9,652,454 B2
(45) Date of Patent: May 16, 2017

(54) PHRASE-BASED DICTIONARY EXTRACTION AND TRANSLATION QUALITY EVALUATION

(71) Applicant: Microsoft Technology Licensing, LLC, Redmond, WA (US)

(72) Inventors: Enyuan Wu, Bellevue, WA (US); Beom Seok Oh, Sammamish, WA (US); Alan Michael, Monroe, WA (US); Kevin O'Donnell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/754,546

(22) Filed: Jun. 29, 2015

(65) Prior Publication Data
US 2015/0302005 A1   Oct. 22, 2015

Related U.S. Application Data

(63) Continuation of application No. 13/548,231, filed on Jul. 13, 2012, now Pat. No. 9,081,762.

(51) Int. Cl.
*G06F 17/28* (2006.01)
*G06F 17/27* (2006.01)

(52) U.S. Cl.
CPC ...... *G06F 17/2854* (2013.01); *G06F 17/2735* (2013.01); *G06F 17/2818* (2013.01); *G06F 17/2827* (2013.01)

(58) Field of Classification Search
CPC .. G06F 17/2818; G06F 17/2827; G06F 17/28; G06F 17/2836; G06F 17/2715;
(Continued)

(56) References Cited

U.S. PATENT DOCUMENTS 5,867,811 A * 2/1999 O'Donoghue ...... G06F 17/2827
704/1
6,789,057 B1 * 9/2004 Morimoto ............. G06F 17/271
704/2

(Continued)

FOREIGN PATENT DOCUMENTS

| CN | 1503161 A | 6/2004 |
|----|-----------|--------|
| CN | 101248432 A | 8/2008 |
| JP | 2003016063 A | 1/2003 |

OTHER PUBLICATIONS

Schwenk, et al., "SMT and SPE Machine Translation Systems for WMT'09", Retrieved at <<http://hal.archives-ouvertes.fr/docs/00/42/46/86/PDF/wmt09_sys.pdf>>, Proceedings of Fourth Workshop on Statistical Machine Translation, Athens: Greece, Oct. 16, 2009, pp. 1-5.

(Continued)

*Primary Examiner* — Huyen Vo
(74) *Attorney, Agent, or Firm* — Daniel Choi; Micky Minhas

(57) ABSTRACT

In one embodiment, a translator quality assurance system may rate a translation using a mapping chart. A data interface 150 may access a translation dictionary matching a source language to a target language. A processor 120 may map automatically a sentence pair having a source sentence 310 in a source language and a target sentence 320 in a target language at a linguistic level using the translation dictionary. A user output device 170 may display a translation quality report of the target sentence 320.

20 Claims, 9 Drawing Sheets

(58) Field of Classification Search
CPC .......... G06F 17/2854; G06F 17/2809; G06F 17/3043; G06F 17/271; G06F 17/289; G06F 17/2872; G06F 17/30669
USPC .......... 704/1–10, 277, 251, 255, 257, 270
See application file for complete search history.

(56) References Cited

U.S. PATENT DOCUMENTS

| | | | |
|---|---|---|---|
| 7,249,012 B2 | 7/2007 | Moore | |
| 7,389,222 B1* | 6/2008 | Langmead | G06F 17/2827 704/2 |
| 8,050,906 B1* | 11/2011 | Zimmerman | G06F 17/2836 704/2 |
| 8,082,142 B2 | 12/2011 | Maegawa | |
| 2004/0030542 A1 | 2/2004 | Fuji | |
| 2007/0050182 A1 | 3/2007 | Sneddon et al. | |
| 2008/0270112 A1 | 10/2008 | Shimohata | |
| 2009/0070102 A1 | 3/2009 | Maegawa | |
| 2009/0192782 A1* | 7/2009 | Drewes | G06F 17/2818 704/3 |
| 2011/0082683 A1 | 4/2011 | Soricut et al. | |
| 2011/0093254 A1 | 4/2011 | Kuhn et al. | |
| 2011/0184722 A1 | 7/2011 | Sneddon et al. | |
| 2011/0202330 A1 | 8/2011 | Dai et al. | |
| 2012/0022852 A1 | 1/2012 | Tresgaskis et al. | |
| 2012/0330990 A1* | 12/2012 | Chen | G06F 17/28 707/761 |

OTHER PUBLICATIONS

Arun, et al., "Monte Carlo inference and maximization for phrase-based translation", Retrieved at <<http://eprints.pascal-network.org/archive/00006748/01/W09-1114.pdf>>, Proceedings of the Thirteenth Conference on Computational Natural Language Learning, Jun. 2009, pp. 102-110.

Tinsley, et al., "Exploiting Parallel Treebanks to Improve Phrase-Based Statistical Machine Translation", Retrieved at <<http://doras.dcu.ie/15815/1/Parallel_Treebanks_in_Phrase-Based_Statistical_Machine.pdf>>, Proceedings of Computational Linguistics and Intelligent Text Processing, Lecture Notes in Computer Science, vol. 5449, Feb. 17, 2009, pp. 318-331.

"ErrorSpy", Retrieved at <<http://www.errorspy.com>>, Retrieved Date: Apr. 5, 2012, pp. 4.

"About QA Distiller", Retrieved at <<http://www.qa-distiller.com>>, Retrieved Date: Apr. 5, 2012, pp. 2.

"ApSIC Xbench", Retrieved at <<http://www.apsic.com/en/products_xbench.html>>, Retrieved Date: Apr. 5, 2012, p. 1.

Makoushina, Julia, "Translation Quality Assurance Tools: Current State and Future Approaches", Retrieved at <<http://www.palex.ru/fc/98/Translation%20Quality%20Assurance%20Tools.pdf>>, Dec. 17, 2007, pp. 1-37.

Brown, et al., "The Mathematics of Statistical Machine Translation: Parameter Estimation", Retrieved at <<http://acl.ldc.upenn.edu/J/J93/J93-2003.pdf>>, Journal of Computational Linguistics—Special issue on using large corpora: II, vol. 19, Issue 2, Jun. 1993, pp. 263-311.

Vogel, et al., "HMM-Based Word Alignment in Statistical Translation", Retrieved at <<http://acl.ldc.upenn.edu/C/C96/C96-2141.pdf>>, Proceedings of the 16th conference on Computational linguistics—vol. 2, 1996, pp. 836-841.

"Levenshtein Edit Distance", Retrieved at <<http://en.wikipedia.org/wiki/Levenshtein_distance>>, Retrieved Date: Apr. 5, 2012, p. 1.

"Soundex", Retrieved at <<http://en.wikipedia.org/wiki/Soundex>>, Retrieved Date: Apr. 5, 2012, pp. 4.

"Compound (Linguistics)", Retrieved at <<http://en.wikipedia.org/wiki/Compound_(linguistics)>>, Retrieved Date: Apr. 5, 2012, pp. 10.

Bauer, Ingrid, "German Compound Words", Retrieved at <<http://german.about.com/od/nounsandcases/a/German-Compound-Words.htm>>, Retrieved Date: Apr. 5, 2012, pp. 2.

Koehn, Phillip, "Statistical Machine Translation", Cambridge University Press, 1st Edition, Jan. 18, 2010, p. 91.

"International Search Report & Written Opinion for PCT Patent Application No. PCT/US2013/049415", Mailed Date: Jan. 15, 2014, Filed Date: Jul. 5, 2013, 18 Pages.

Brown, Ralf D., "Automated Dictionary Extraction for 'Knowledge Free' Example-Based Translation", In Proceedings of the Seventh International Conference on Theoretical and Methodological Issues in Machine Translation, Jul. 23, 1997, pp. 111-118.

Thurmair, et al., "Creating Term and Lexicon Entries from Phrase Tables", In Proceedings of the 16th EAMT Conference, May 28-30, 2012, pp. 253-260.

Hermjakob, Ulf, "Improved Word Alignment with Statistics and Linguistics Heuristics", In Proceedings of the 2009 Conference on Empirical Methods in Natural Language Processing, vol. 1, Aug. 6-7, 2009, pp. 229-237.

Yang, et al., "Phrase-Based Backoff Models for Machine Translation of Highly Inflected Languages", In Proceedings of the 21st International Conference on Computational Linguistics, Apr. 3, 2007, 8 Pages.

"International Preliminary Report on Patentability Issued in PCT Application No. PCT/US2013/049415", Mailed Date: Jan. 13, 2015, 12 Pages.

"Final Office Action Issued in U.S. Appl. No. 13/548,231", Mailed Date: Oct. 27, 2014, 14 Pages.

"Non-Final Office Action Issued in U.S. Appl. No. 13/548,231", Mailed Date: Jun. 13, 2014, 14 Pages.

"Notice of Allowance Issued in U.S. Appl. No. 13/548,231", Mailed Date: Mar. 4, 2015, 10 Pages.

"First office Action and Search Report issued in Chinese Patent Application No. 201380037412.6", Mailed Date: May 30, 2016, 20 Pages.

"Office Action Issues in Chinese Patent Application No. 201380037412.6", Mailed Date: Dec. 28, 2016, 12 Pages.

* cited by examiner

200

500

PHRASE-BASED DICTIONARY EXTRACTION AND TRANSLATION QUALITY EVALUATION

CROSS-REFERENCE TO RELATED APPLICATIONS

This patent application is a continuation of U.S. patent application Ser. No. 13/548,231 on Jul. 13, 2012, which is herein incorporated by reference in its entirety.

BACKGROUND

Human translators may execute a translation from a first language to a second language. Alternately, a software application may apply a translation dictionary to execute the translation. The success or failure of the translation may be determined by an independent auditor. The independent auditor may be a second human translator or a translation auditing program.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to rating a translation using a mapping chart. A data interface may access a translation dictionary matching a source language to a target language. A processor may automatically map a sentence pair having a source sentence in a source language and a target sentence in a target language at a linguistic level using the translation dictionary. A user output device may display a translation quality report of the sentence pair.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict typical embodiments and are not therefore to be considered to be limiting of its scope, implementations will be described and explained with additional specificity and detail through the use of the accompanying drawings.

DETAILED DESCRIPTION

Figure 1:
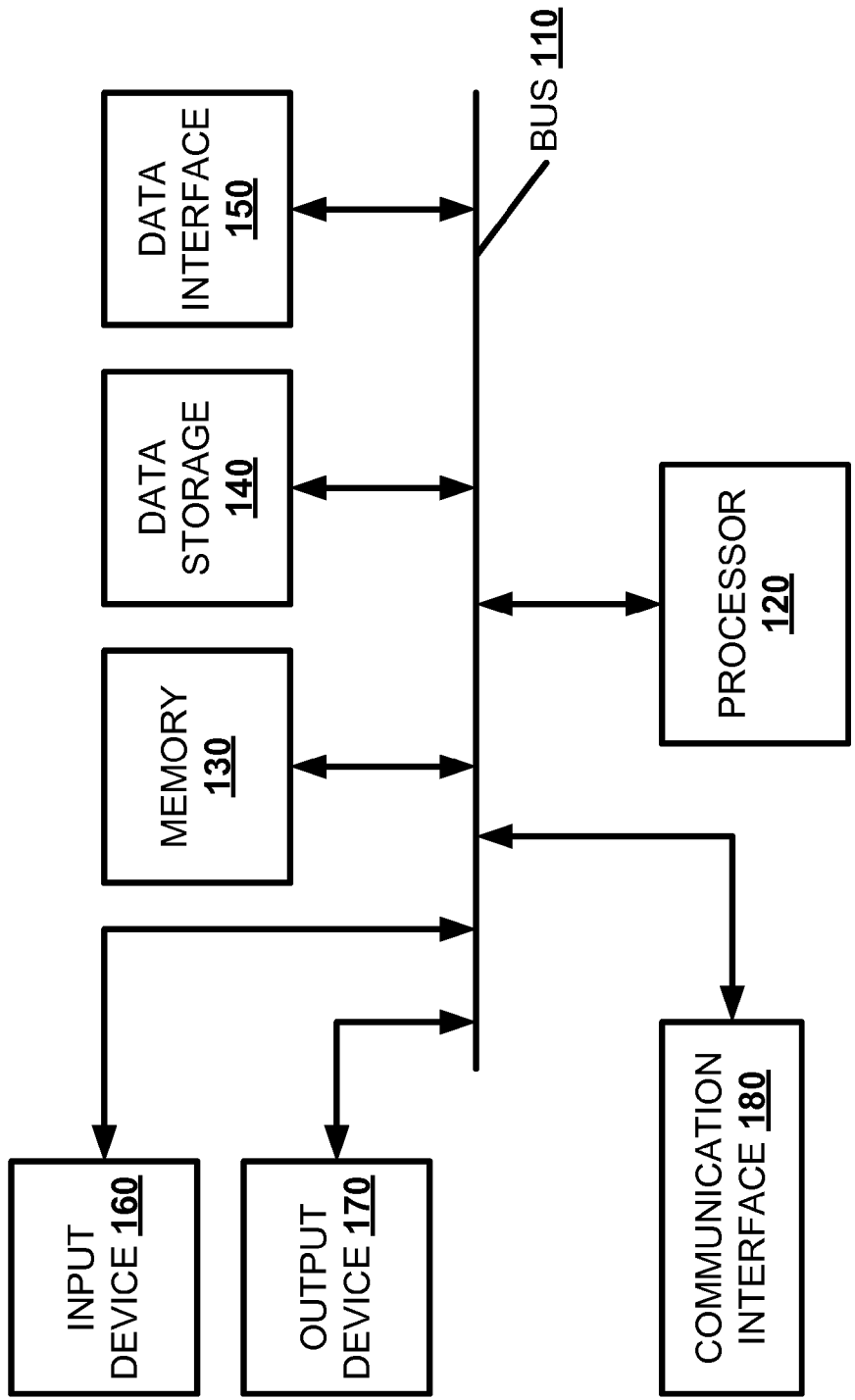
FIG. 1 illustrates, in a block diagram, one embodiment of a computing device.

Embodiments are discussed in detail below. While specific implementations are discussed, this is done for illustration purposes. A person skilled in the relevant art will recognize that other components and configurations may be used without parting from the spirit and scope of the subject matter of this disclosure. The implementations may be a machine-implemented method, a tangible computer-readable medium having a set of instructions detailing a method stored thereon for at least one processor, or a translation quality assurance system.

Translation quality assurance tools may use many different metrics in determining the quality of a translation, such as segment level checks, consistency, punctuation, numbers and dates, terminology, tags, and software specific constructs. The accuracy of a translation quality assurance system may be improved by using a translation dictionary to map words and phrases between a bilingual sentence pair. A "phrase", or a "segment", is a set of one or more consecutive words adjacent to each other without gaps, disregarding meaning and grammatical correctness. A sentence in this context is a string of one or more words, not necessarily a grammatical sentence. The sentence may be a complete sentence or an incomplete sentence. The translation quality assurance system may extract a translation dictionary from two parallel text files, map a source sentence to a target sentence, and collect the resulting statistics into a translation quality report.

First, a translation quality assurance system may build a bilingual dictionary from a training data set of parallel bilingual sentence pairs using an integrated, length-adjustable, and auto-pruning phrase-based comparison in conjunction with a statistical machine translation model. Currently, a phrase-based statistical machine translation model may build an initial word-to-word alignment, or "translation dictionary", extracting phrases using additional models and calculations. As the word-level translation dictionary may have noise, the "word mapping" in parallel sentence pairs and the final phrase extraction may introduce further noise. Thus, the extracted translation dictionary may have a high level of noise, incurring additional calculation steps in existing statistical machine translation methods.

The translation quality assurance system may segment both a source sentence and a target sentence into words and phrases having an upper bound number of words, such as eight. The translation quality assurance system may feed the mixed word-phrase list into a statistical machine translation model to determine alignments. The translation quality assurance system may prune phrases with no translations or low translation probability from the mixed word-phrase lists. The translation quality assurance system may continue looping until reaching the single word level.

Specifically, the translation quality assurance system may start with a high number of words in a phrase, such as eight. The translation quality assurance system may divide a sentence in a source language into a mixed list of words and phrases and repeat the same process for the target language. The translation quality assurance system may use both mixed lists, along with bi-lingual sentence pairs, as the input to a statistical machine translation model. By looping through the bilingual sentence pairs, the statistical machine translation model may determine the likelihood of each translation by calculating the probability.

The translation quality assurance system may generate a first round translation probability table, or translation dictionary. Then, the translation quality assurance system may prune the mixed word-phrase lists to remove any phrases at that level that do not have translations or have low translation probabilities, leaving trustworthy phrases at that phrase length. In the next step, the translation quality assurance system may decrease the maximum number of words allowed in a phrase by one and repeats the process. This segmenting, training, and pruning process may continue until a single word phrase length is reached. If using an asymmetric statistical machine translation model, the translation quality assurance system may reverse the source and translation, repeat the process, and overlay the results. An asymmetric statistical machine translation has results between the pair of languages that differ based on which language is considered the source language.

The translation quality assurance system may create a mixed word-phrase list for each language in the translation pair. The translation quality assurance system may segment a source sentence or a target sentence into words, adding each word to a word list with the frequency that the word appears in the entire training data. Then, the translation quality assurance system may add consecutive two words to the two-word phrase list, repeating the process until an upper bound on the number of words in a phrase is reached, such as eight. The translation quality assurance system may check the frequencies of each phrase against a pre-defined threshold for appearances, such as five appearances. When adding a greater number of words to the phrase list, the translation quality assurance system may ensure that the underlying shorter phrases are valid. Finally, the translation quality assurance system may merge the words and phrases of all lengths into a single mixed word-phrase list to be used as the initial input for the dictionary extraction process.

With the sentences in the training data divided into mixed word-phrase lists for both the source language and target language, the translation quality assurance system may calculate the initial translation probability table, using any statistical machine translation model. Once the first round of statistical machine translation training is completed, the translation quality assurance system may remove the phrases without translation or with low translation probability from the mixed word-phrase list. After the selected phrases removed from the initial mixed word-phrase list, the translation quality assurance system may re-segment the sentences and recalculate the translation probability table. Thus, the segmenting, training, and pruning process may continue until the single word level is reached. The translation quality assurance system may overlay translation probability tables in asymmetric statistical machine translation dictionary extraction.

After iterations of segmenting, training, and pruning, the translation quality assurance system may produce a bilingual phrase dictionary. Usually, dictionary entries with translation probability greater than 0.5 may be considered reliable, those dictionary entries with a translation probability between 0.25 and 0.5 may be considered marginally usable, whereas those dictionary entries with a translation probability below 0.25 may be considered unreliable. With more detailed parameter adjustments, higher number of iterations and a larger size of training data, the results may improve.

Using this domain-specific extracted bilingual dictionary, the translation quality assurance system may map a source sentence to a target sentence in a given bilingual sentence pair to verify the quality of the translation. The translation quality assurance system may begin by segmenting the text file segments into a word list. For each word in the word list for the source language, the translation quality assurance system may first create a list of phrases, beginning with the upper bound number of words in a phrase. The translation quality assurance system may try to find out if such a phrase exists in the extracted bilingual dictionary. If so, the translation quality assurance system may check the list of translations for this phrase to see if any translation exists in the target sentence. If so, the translation quality assurance system may check if none of the words in the target sentence are matched. If so, translation quality assurance system may update the match information to indicate a match. If source phrases with more words are left unmatched, the translation quality assurance system may decrement the number of words in the phrase and repeat until single words are checked.

In many languages, certain words may serve grammatical purposes and appear too often. These "noisy words" may be translated in multiple ways or not even translated. Further, these noisy words may appear multiple times in one sentence, interfering with proper source-target sentence mapping. To avoid misalignment, the translation quality assurance system may defer or even forgo mapping.

If the alignment efforts lead to failure on some words, the translation quality assurance system may use fuzzy matching to compensate. In many spelling based languages, words may change spelling to fulfill some linguistic function, avoiding easy detection. Using a version of fuzzy matching, the translation quality assurance system may get a better matching rate.

In some languages, such as German, Dutch, Finnish, and Icelandic, compound words may be created spontaneously. To cope with compound words, the translation quality assurance system may combine sequential unmapped words into a compound word, prior to sentence mapping.

To perform compound word mapping, the translation quality assurance system may loop through each unmapped word in the target sentence, find any unmapped source word that has a translation that is the prefix of the compound word. If such a source word is found, then the source word may be the first substring in the compound word. Then the translation quality assurance system may check the next source word. If the source word is already mapped, the translation quality assurance system may exit the mapping process. Otherwise, the translation quality assurance system may check all the target translations to find one that can concatenate with the first substring and still is the prefix or equals the compound word. The build-up may continue until either success or bailout. The translation quality assurance system may also use fuzzy matching in determining a compound word match.

Using multiple rounds of mapping, the translation quality assurance system may cycle through multiple options. The translation quality assurance system may begin with a preferred terminology dictionary, a domain-specific translation dictionary, an extracted translation dictionary, a general translation dictionary, compound word mapping, fuzzy match mapping, and then noisy word mapping.

The translation quality assurance system may then produce a translation quality report to provide to the human translator or translation quality check personnel. The translation quality report may include a confidence score. The confidence score may be word based or character based. A word confidence score may divide the total number of mapped words by the total number of words. A character confidence score may divide the total number of characters in mapped words by the total number of characters in the sentence. A hybrid confidence score may average the two. The confidence score may be different in the source sentence and the target sentence. The overall confidence score may be the lesser of the two.

The translation quality assurance system may display the mapping data visually in a mapping chart. The translation quality assurance system may color code each phrase or word in the text file segment to indicate mapping, with a specially assigned color used to indicate unmapped words, such as black. The mapping chart may indicate mapping for each words or just those words that are translated improperly.

The translation quality assurance system may provide the translation quality report in realtime. The user may update the translation quality assurance system to correct any notice of mistranslation that is the result of incomplete data or an error in the system. The translation quality assurance system may identify the insertion of a source phrase or a target phrase that does not have a readily identifiable match, and categorize the insertion as proper or improper. These insertions may be used by the translator when a word in a source language has no equivalent in the target language. Additionally, the translation quality assurance system may detect a "forgotten translation", where the source phrase and the target phrase are the same.

Thus, in one embodiment, a translator quality assurance system may rate a translation using a mapping chart. A data interface may access a translation dictionary matching a source language to a target language. A processor may map automatically a sentence pair having a source sentence in a source language and a target sentence in a target language at a linguistic level using the translation dictionary. A user output device may display a translation quality report of the target sentence.

FIG. 1 illustrates a block diagram of an exemplary computing device 100 which may act as a translation quality assurance system. The computing device 100 may combine one or more of hardware, software, firmware, and system-on-a-chip technology to implement a translation quality assurance system. The computing device 100 may include a bus 110, a processor 120, a memory 130, a data storage 140, a data interface 150, an input device 160, an output device 170, and a communication interface 180. The bus 110, or other component interconnection devices, may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120.

The data storage 140 may include any type of tangible computer-readable medium, such as, for example, magnetic or optical recording media, such as a digital video disk, and its corresponding drive. A tangible computer-readable medium is a physical medium storing machine-readable code or instructions, as opposed to a signal. Having instructions stored on a computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The data interface 150 may be a data storage 140, a database, or a data interface for storing or accessing a translation dictionary or multiple specialty translation dictionaries.

The input device 160 may include one or more conventional mechanisms that permit a user to input information to the computing device 100, such as a keyboard, a mouse, a voice recognition device, a microphone, a headset, a gesture recognition device, a touch screen, etc. The output device 170 may include one or more conventional mechanisms that output information to the user, including a display, a printer, one or more speakers, a headset, or a medium, such as a memory, or a magnetic or optical disk and a corresponding disk drive. The communication interface 180 may include any transceiver-like mechanism that enables computing device 100 to communicate with other devices or networks. The communication interface 180 may include a network interface or a transceiver interface. The communication interface 180 may be a wireless, wired, or optical interface.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

Figure 2:
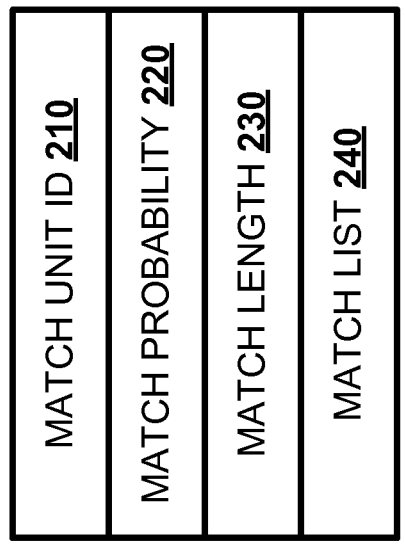
FIG. 2 illustrates, in a block diagram, one embodiment of a match unit.

The translation quality assurance system may use a match unit as a data structure to facilitate mapping the source sentence to the target sentence. FIG. 2 illustrates, in a block diagram, one embodiment of a match unit 200. The match unit 200 may facilitate multiple rounds of mapping. A match unit identifier 210 may describe the index of the element in the source sentence or the target sentence. The target match unit 200 or source match unit may be a word, a compound word, or a punctuation mark. A match probability field 220 may describe the probability of a match between words in a sentence pair. The probability field 220 may show the probability value from the translation dictionary.

The match length field 230 in the match unit 200 may describe the number of consecutive words in the source sentence or target sentence. The match length field 230 may be initialized to zero, indicating no match yet. A match length value of one may indicate a single word match, with match values greater than one indicating a multi-word phrase match. In a multi-word phrase match case, neighboring words may have the same match length value. The match length field 230 may indicate a single word match or a multi-word phrase match.

The match list field 240 may describe a list of word indexes of matched words in the matching sentence of the bilingual sentence pair. An empty match list field 240 may indicate that the word is not matched yet, with a match length field 230 having a zero value to be in sync with the empty match list. A single item match list field 240 may indicate that a single word from the other sentence matched this word.

Figure 3:
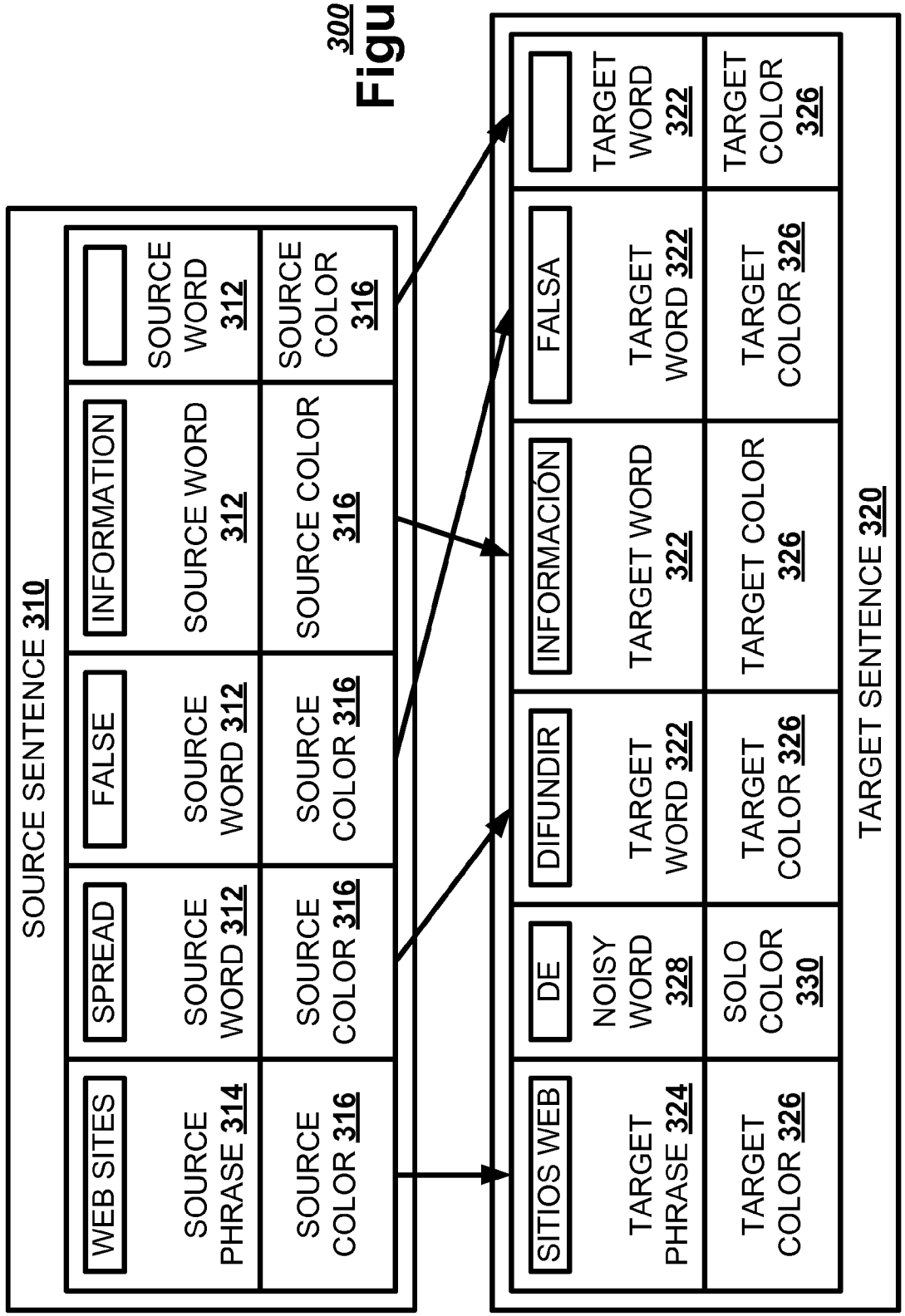
FIG. 3 illustrates, in a block diagram, one embodiment of a mapping chart.

The translation quality assurance system may create a mapping chart to display to the user. FIG. 3 illustrates, in a block diagram, one embodiment of a mapping chart 300. The mapping chart 300 may map source elements of a source sentence 310 to target elements in a target sentence 320. An element refers to a word or a phrase in a sentence.

For example, the source sentence 310 may be "Web sites spread false information." In this example, the source language may be English. The target sentence 320 may be "Sitios web de difundir informacion falsa." The target language may be Spanish.

The source sentence 310 may be segmented into source words 312 initially. A source word 312 may represent a punctuation mark as well as a word. Consecutive source words 312 may be combined into a source phrase 314 to be mapped to any target element. The adoption of a source phrase 314 may depend on finding a matching target element. A source element may refer to either a source word 312 or a source phrase 314. Each source word 312 and source phrase 314 may have a different source color code 316.

The target sentence 320 may be segmented into target words 322. A target word 322 may represent a punctuation mark as well as a word. Consecutive target words 322 may be combined into a target phrase 324 to be mapped to any source element. The adoption of a target phrase 324 may depend on finding a matching source element. A target element may refer to either a target word 322 or a target phrase 324. Each target word 322 and target phrase 324 may have a different target color code 326.

The translation quality assurance system may match a source word 312 to a target word 322 or a target phrase 324. The translation quality assurance system may match a source phrase 314 to a target word 322 or a target phrase 324. The source elements may be in a different order from the matching target elements. A target color code 326 may match a source color code 316 to indicate that a target word 322 or a target phrase 324 matches a source word 312 or a source phrase 314. For example, the source word 312 "false" may have a source color code 316 blue. The target word 322 "falsa" may have a target color code 326 blue, indicating that the source word 312 "false" matches the target word 322 "falsa". Color coding may be random, allowing changes upon refreshing. Thus, neighboring elements with a similar color may be reset to better distinguish the mappings.

The translation quality assurance system may identify any noisy words 328 in either the source sentence 310 or the target sentence 320. A noisy word 328 is a common word in one language serving mostly a functional purpose. A noisy word 328 may not appear in other languages. For example, instances of the noisy word 328 "de" may appear in Spanish in conjunction with a verb, with no equivalent English word used. Additionally, a long sentence may have many noisy words 328 matching many different words in the different language. For example, the English article "a" may translate to the French article "Un" or "Une" depending on the gender of the noun that follows. Thus, "a girl" may translate to "une fille" while "a boy" may translate to "un garcon". The translation quality assurance system may defer matching the noisy word 328 until the other words in the text file segment have been matched. An unmatched word may have a solo color code 320, such as black, indicating that the word does not have a matching word in the matching text file segment.

Figure 4:
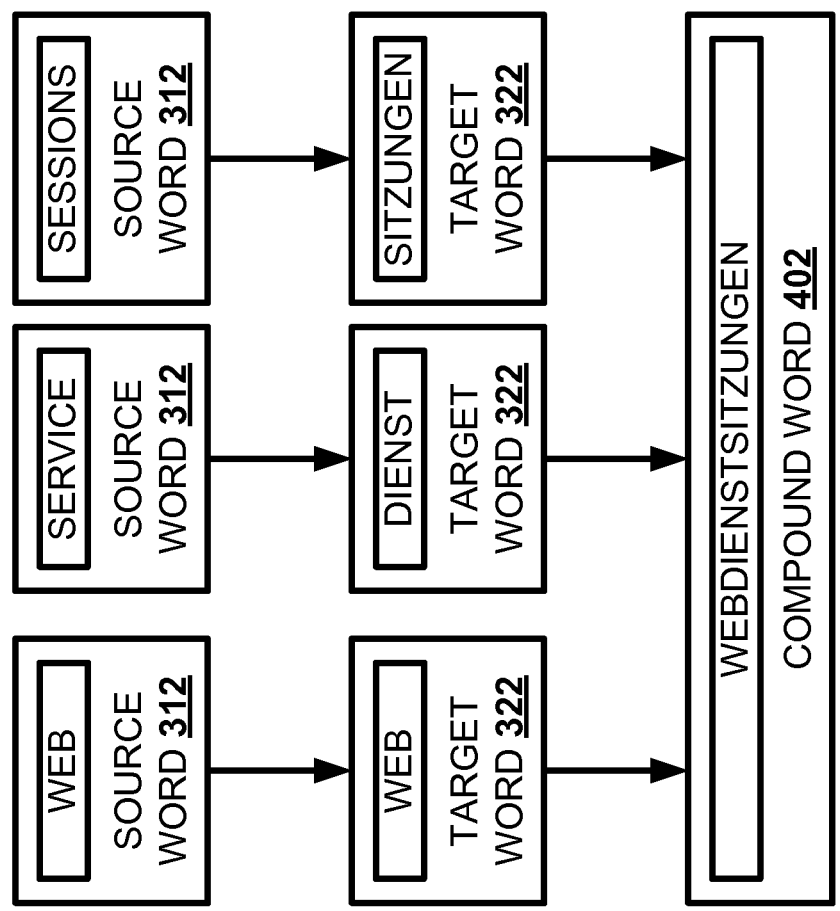
FIG. 4 illustrates, in a block diagram, one embodiment of a compound word mapping.

Some languages, such as German, may have a compound word representing multiple words. FIG. 4 illustrates, in a block diagram, one embodiment of a compound word mapping 400. A translation quality assurance system may match each source word 312 to a target word 322. The translation quality assurance system may combine the target words 322 to create a compound word 402. While the compound word 402 is shown in the target sentence 320 in this example, the compound word may be in the source sentence 310.

For example, the English phrase "web service sessions" may be segmented into the source words 312 "web", "service", and "sessions". In German, the translated target words 322 may be "web", "dienst", and "sitzungen". However, none of these single words may have appeared in the German sentence. The translation quality assurance system may combine those target words 322 into the compound word 402 "webdienstsitzungen" to achieve the mapping.

Figure 5:
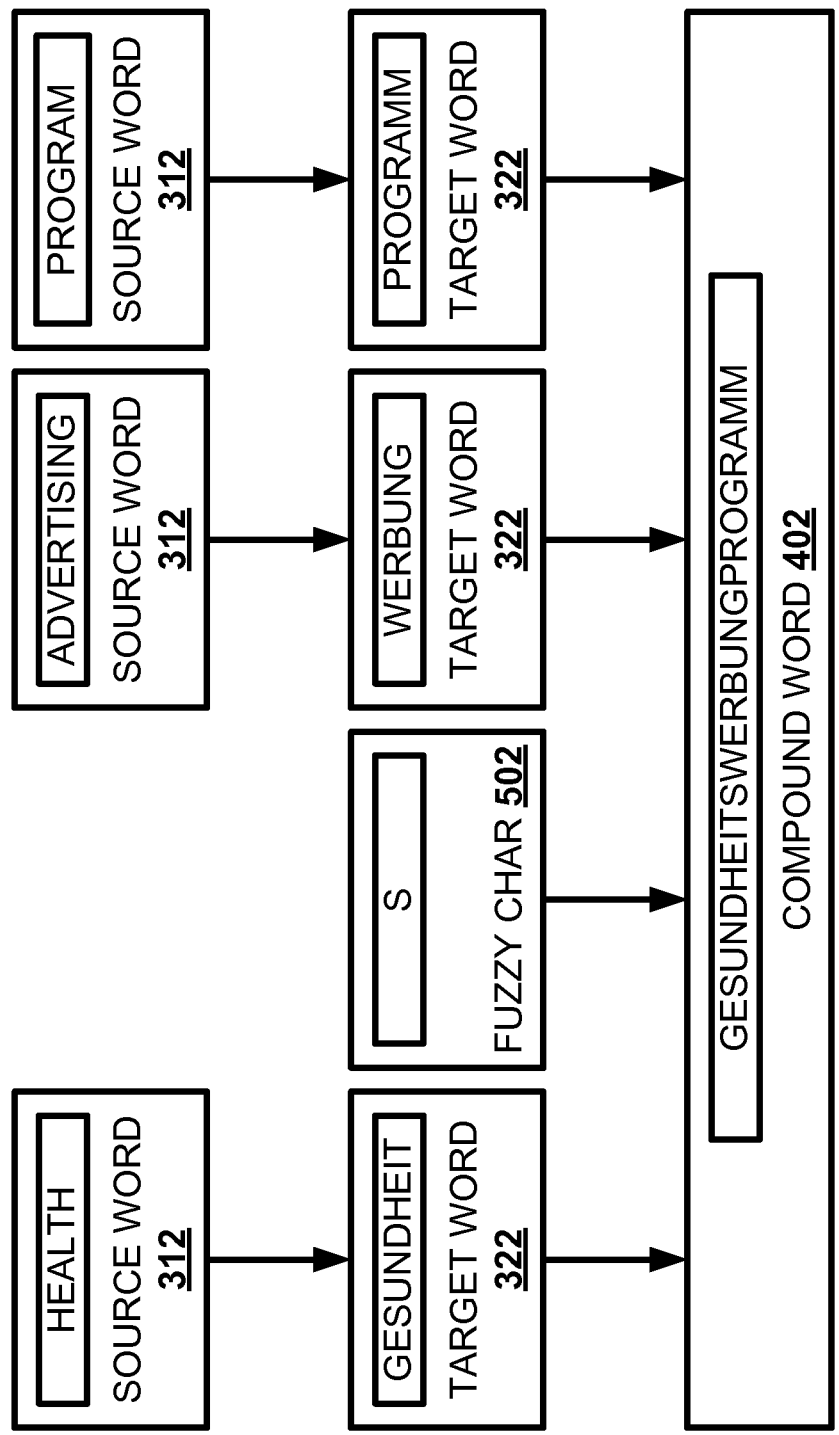
FIG. 5 illustrates, in a block diagram, one embodiment of a fuzzy compound word mapping.

Occasionally, the match between a compound word 402 and the source words 312, or the target words 322, may not be exact. FIG. 5 illustrates, in a block diagram, one embodiment of a fuzzy compound word mapping 500. A translation quality assurance system may match each source word 312 to a target word 322. The translation quality assurance system may combine the target words 322 to create a compound word 402 having a fuzzy character 502 in addition to the target words 322. The translation quality assurance system may use additional logic to identify that the simple concatenation of target words 322 and the actual target compound word 402 are similar enough that the source words 312 match the target compound word 402. While the compound word 402 is shown in the target sentence 320 in this example, the compound word may be in the source sentence 310.

For example, the English phrase "health advertising program" may be segmented into the source words 312 "health", "advertising", and "program". In German, the translated target words 322 may be "gesundheit", "werbung", and "programm". The translation quality assurance system may combine those target words 322 into a compound word 402 having a fuzzy character "s" 502 to read "gesundheitswerbungprogramm". The translation quality assurance system may use fuzzy matching logic to establish the correspondence between the target words 322 and the target compound word 402.

Figure 6:
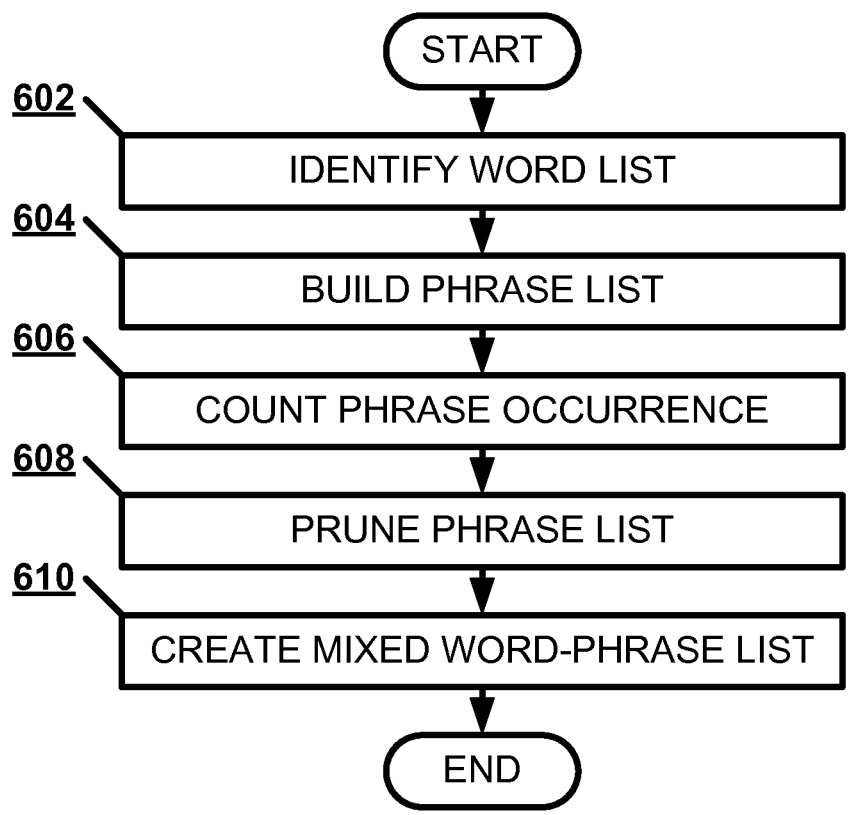
FIG. 6 illustrates, in a flowchart, one embodiment of a method for creating a mixed word-phrase list.

The translation quality assurance system may develop a proprietary dictionary, or import a dictionary from a different source. The translation quality assurance system may create a mixed word-phrase list in each featured language in the language pair using a training data set. A training data set is a text file that represents a large pool of sentence pairs with each sentence of the sentence pair being a trustworthy translation of the other sentence in the sentence pair. FIG. 6 illustrates, in a flowchart, one embodiment of a method 600 for creating a mixed word-phrase list. The translation quality assurance system may identify a word list in a training data set for one language (Block 602). The translation quality assurance system may build a phrase list in the training data set for the language, assuming any neighboring words may be phrase regardless of grammatical meaning or correctness (Block 604). The translation quality assurance system may count the appearances in the training data set for each phrase in the phrase list (Block 606). The translation quality assurance system may prune a phrase from the phrase list based on a phrase occurrence threshold (Block 608). The translation quality assurance system may create a mixed word-phrase list based on the word list and phrase list (Block 610). The translation quality assurance system may create a mixed word-phrase list for both languages in the language pair.

Figure 7:
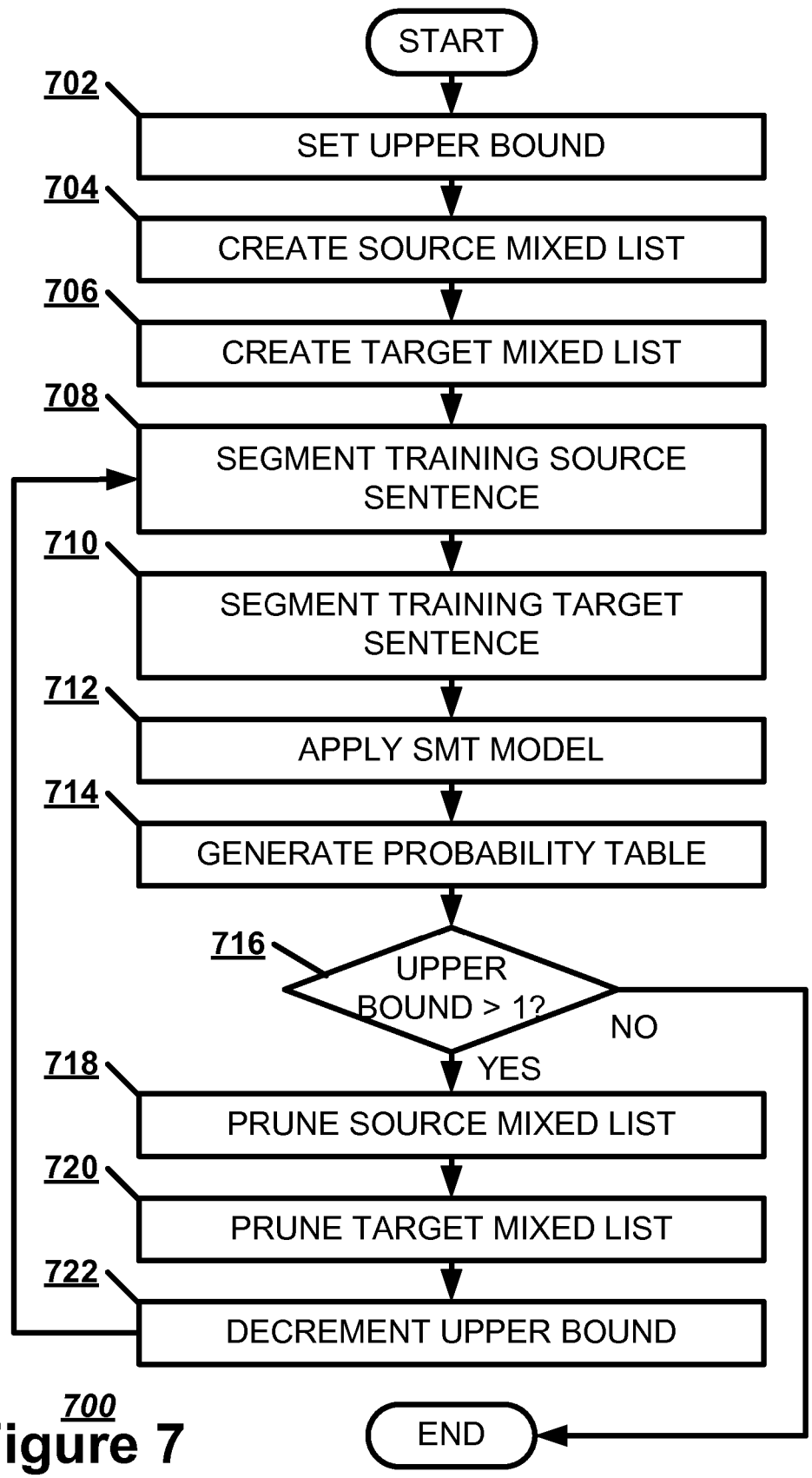
FIG. 7 illustrates, in a flowchart, one embodiment of a method for creating a translation dictionary.

Using the mixed word-phrase lists, the translation quality assurance system may use a statistical translation model to extract a translation dictionary based on a training data set. FIG. 7 illustrates, in a flowchart, one embodiment of a method 700 for extracting a translation dictionary. The translation quality assurance system may set an upper bound for words in a phrase, such as eight (Block 702). The translation quality assurance system may create a source mixed word-phrase list for a source language from the training data set (Block 704). The translation quality assurance system may create a target mixed word-phrase list for a target language from the training data set (Block 706). The translation quality assurance system may segment a training source sentence based on the source mixed word-phrase list (Block 708). The translation quality assurance system may segment a training target sentence based on the target mixed word-phrase list (Block 710). The translation quality assurance system may apply a statistical machine translation (SMT) model to the source mixed word-phrase list and the target mixed word-phrase list, along with each sentence pair in the training data set (Block 712).

As the result of training with the statistical machine translation model, the translation quality assurance system may generate a translation probability table, detailing the likelihood of translating each source element in the source mixed word-phrase list to any target element in the target mixed word-phrase list (Block 714). This translation probability table is referred to as a "translation dictionary". If the upper bound is greater than one (Block 716), the translation quality assurance system may prune the source mixed word-phrase list to remove any source phrases 314 with a word count equal to the upper bound and low translation probability, such as less than 0.25 (Block 718). The translation quality assurance system may prune the target mixed word-phrase list to remove any target phrases 324 with a word count equal to the upper bound and low translation probability, such as less than 0.25 (Block 720). The translation quality assurance system may decrement the upper bound (722) and may re-segment the source training data set to renew the process (Block 708). The translation quality assurance system may end the extraction when the upper bound reaches one, having removed phrases with low translation probabilities from the mixed word-phrase lists and the translation dictionary.

Figure 8:
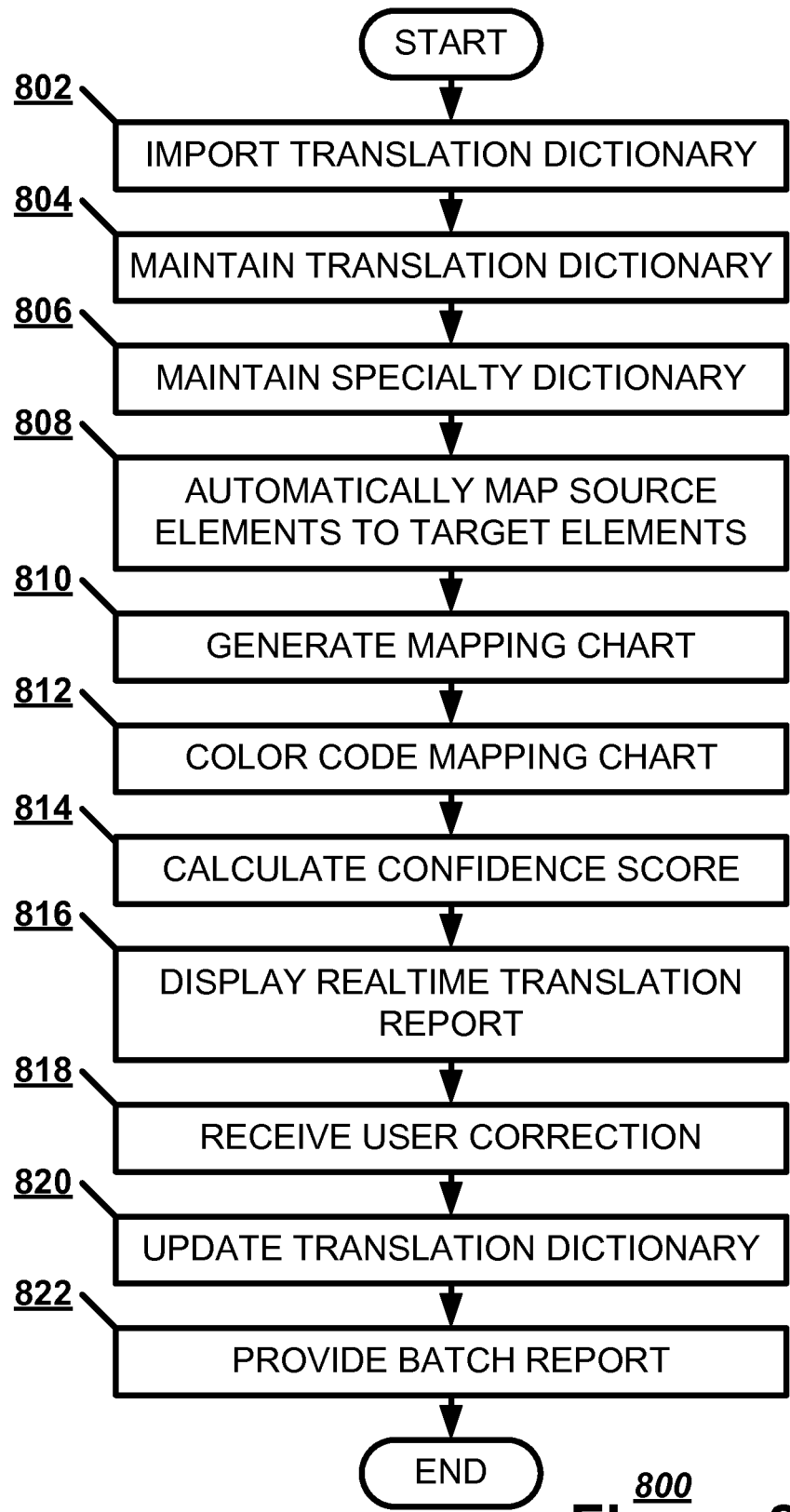
FIG. 8 illustrates, in a flowchart, one embodiment of a method for generating a translation quality report.

Using a translation dictionary, a translation quality assurance system may map source elements and target to calculate a translation confidence score and generate a translation quality report for a sentence pair. FIG. 8 illustrates, in a flowchart, one embodiment of a method 800 for assessing translation quality. The translation quality assurance system may import a translation dictionary from a dictionary source (Block 802). Alternately, the translation quality assurance system may generate the translation dictionary based on a training data set, as described in FIG. 7. The translation quality assurance system may maintain a translation dictionary matching a source language to a target language (Block 804). The translation quality assurance system may maintain a specialty translation dictionary if any niche documents are being translated (Block 806).

For each sentence pair having a translation quality check, the translation quality assurance system may automatically map a sentence pair having a source sentence 310 in a source language and a target sentence 320 in a target language at a linguistic level using the translation dictionary (Block 808). By mapping the sentence pair at a linguistic level, the translation quality assurance system may match a source element of the source sentence to a target element of the target sentence. The translation quality assurance system may generate a mapping chart 300 between the target sentence 320 and the source sentence 310 for display in the translation quality report (Block 810). The translation quality assurance system may color code the mapping chart to indicate which source words and source phrases align with which target words and target phrases (Block 812). The translation quality assurance system may calculate a confidence score for the sentence pair in the translation quality report (Block 814).

The translation quality assurance system may produce and display the translation quality report of the sentence pair in realtime (Block 816). The translation quality assurance system may receive any user corrections to the realtime translation quality report (Block 818). The translation quality assurance system may update the translation dictionary based on the user correction (Block 820). The translation quality assurance system may provide a batch report to the user aggregating the results of multiple translations (Block 822).

Figure 9:
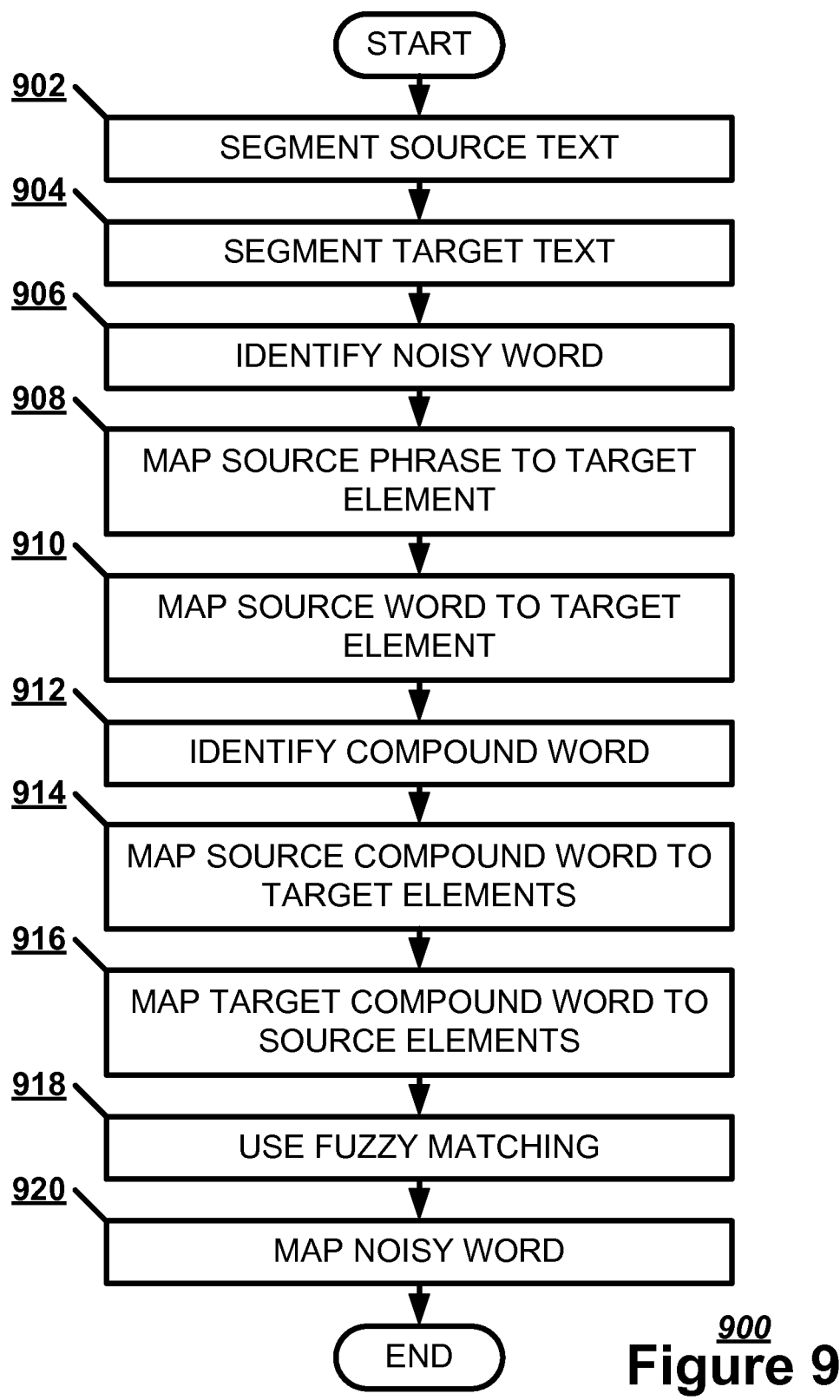
FIG. 9 illustrates, in a flowchart, one embodiment of a method for creating a mapping chart.

FIG. 9 illustrates, in a flowchart, one embodiment of a method 900 for creating a mapping chart 300. The translation quality assurance system may segment a source sentence 310 based on the extracted dictionary (Block 902). The translation quality assurance system may segment a target sentence 320 based on the extracted dictionary (Block 904). The translation quality assurance system may identify a noisy word for deferred matching, or matching after the other words have been matched (Block 906). For each mappable source phrase 314 of the source sentence 310, the translation quality assurance system may map a source phrase 314 of the source sentence 310 to a target element of the target sentence 320 prior to mapping a source word 312 to a target element (Block 908). For each mappable source word 312 of the source sentence 310, the translation quality assurance system may map a source word 312 of the source sentence 310 to a target element of the target sentence 320 (Block 910). The translation quality assurance system may identify an unmapped word 322 in the source sentence 310 or a target sentence 320 as a compound word 402 (Block 912). The translation quality assurance system may then map the compound word to any matching elements, possibly using fuzzy matching. The translation quality assurance system may map a source compound word 402 to target elements, possibly using fuzzy matching (Block 914). The translation quality assurance system may map the target compound word 402 to source elements, possibly using fuzzy matching (Block 916). The translation quality assurance system may use fuzzy matching to map an unmatched element, such as an unmatched source element to an unmatched target element, or vice versa (Block 918). The translation quality assurance system may map any noisy words 324 (Block 920).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include tangible computer-readable storage media for carrying or having computer-executable instructions or data structures stored thereon. Such tangible computer-readable storage media may be any available media that can be accessed by a general purpose or special purpose computer. By way of example, and not limitation, such tangible computer-readable storage media can comprise RAM, ROM, EEPROM, CD-ROM or other optical disk storage, magnetic disk storage or other magnetic storage devices, or any other tangible non-transitory medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A translation quality assurance system, comprising:
    a data interface configured to access
        a translation probability table matching a source language to a target language generated by iteratively pruning a source mixed word-phrase list for the source language and a target mixed word-phrase list for the target language using a statistical machine translation model, wherein the iterative pruning starts with an upper bound for words in a source phrase of the source mixed word phrase list and words in a target phrase of the target mixed word phrase list and includes for each iteration:
            pruning a source phrase with low translation probability according to the statistical machine translation model from the source mixed word phrase list and a target phrase with low translation probability according to the statistical machine translation model from the target mixed word phrase list, and
            decrementing the upper bound;
    a processor configured to:
        map automatically a sentence pair having a source sentence in the source language and a target sentence in the target language at a linguistic level using the translation probability table, and
        generate a translation quality report describing a translation quality of the sentence pair; and
    a user output device configured to display the translation quality report of the sentence pair.

2. The translation quality assurance system of claim 1, wherein the processor is configured to calculate a translation confidence score for the sentence pair.

3. The translation quality assurance system of claim 1, wherein the translation quality report displays a mapping chart between the target sentence and the source sentence.

4. The translation quality assurance system of claim 3, wherein the translation quality report color codes the mapping chart.

5. The translation quality assurance system of claim 1, wherein the processor is configured to produce the translation quality report in realtime.

6. The translation quality assurance system of claim 1, wherein the processor is configured to map a source word of the source sentence to a target element of the target sentence.

7. The translation quality assurance system of claim 1, wherein the processor is configured to map a source phrase of the source sentence to a target element of the target sentence prior to mapping a source word.

8. The translation quality assurance system of claim 1, wherein the processor is configured to identify a noisy word for deferred matching.

9. The translation quality assurance system of claim 1, wherein the processor is configured to use fuzzy matching to map an unmatched element.

10. The translation quality assurance system of claim 1, wherein the data interface is configured to update the translation probability table based on a user correction.

11. The translation quality assurance system of claim 1, wherein the processor is configured to segment a training source sentence based on the source mixed word-phrase list.

12. The translation quality assurance system of claim 1, wherein the processor is configured to create the source mixed word-phrase list for the source language and the target mixed word-phrase list for the target language from a training data set.

13. A method implemented by a translation quality assurance system, comprising:
    generating through iterative pruning a translation probability table matching a source language to a target language from a source mixed word-phrase list for the source language and a target mixed word-phrase list for the target language based on a statistical machine translation model, wherein the iterative pruning starts with an upper bound for words in a source phrase of the source mixed word phrase list and words in a target phrase of the target mixed word phrase list and includes for each iteration:
        pruning a source phrase with low translation probability according to the statistical machine translation model from the source mixed word phrase list and a target phrase with low translation probability according to the statistical machine translation model from the target mixed word phrase list, and
        decrementing the upper bound;
    mapping automatically a sentence pair having a source sentence in the source language and a target sentence in the target language at a linguistic level using the translation probability table; and
    generating automatically a translation quality report describing a translation quality of the sentence pair.

14. The method of claim 13, further comprising:
    creating the source mixed word-phrase list for the source language and target mixed word-phrase list for the target language from a training data set.

15. The method of claim 13, further comprising:
displaying a mapping chart between the target sentence and the source sentence.

16. The method of claim 13, further comprising:
producing the translation quality report in realtime.

17. The method of claim 13, further comprising:
Identifying a noisy word for deferred matching.

18. A computing device, having a memory configured to store a set of instructions that perform translation quality assurance when executed by a processor, the computing device configured to:

generate through iterative pruning a translation probability table matching a source language to a target language from a source mixed word-phrase list for the source language and a target mixed word-phrase list for the target language based on a statistical machine translation model, wherein the iterative pruning starts with an upper bound for words in a source phrase of the source mixed word phrase list and words in a target phrase of the target mixed word phrase list and includes for each iteration:

pruning a source phrase with low translation probability from the source mixed word phrase list and a target phrase with low translation probability from the target mixed word phrase list, and decrementing the upper bound;

map automatically a sentence pair having a source sentence in the source language and a target sentence in the target language at a linguistic level using the translation probability table; and generate automatically a translation quality report describing a translation quality of the sentence pair.

19. The computing device of claim 18, the computing device further configured to identify a noisy word for deferred matching.

20. The computing device of claim 18, the computing device further configured to display a mapping chart between the target sentence and the source sentence.

* * * * *